No. 731,555. PATENTED JUNE 23, 1903.
A. EMY.
DOUBLE FURNACE.
APPLICATION FILED DEC. 17, 1902.
NO MODEL.
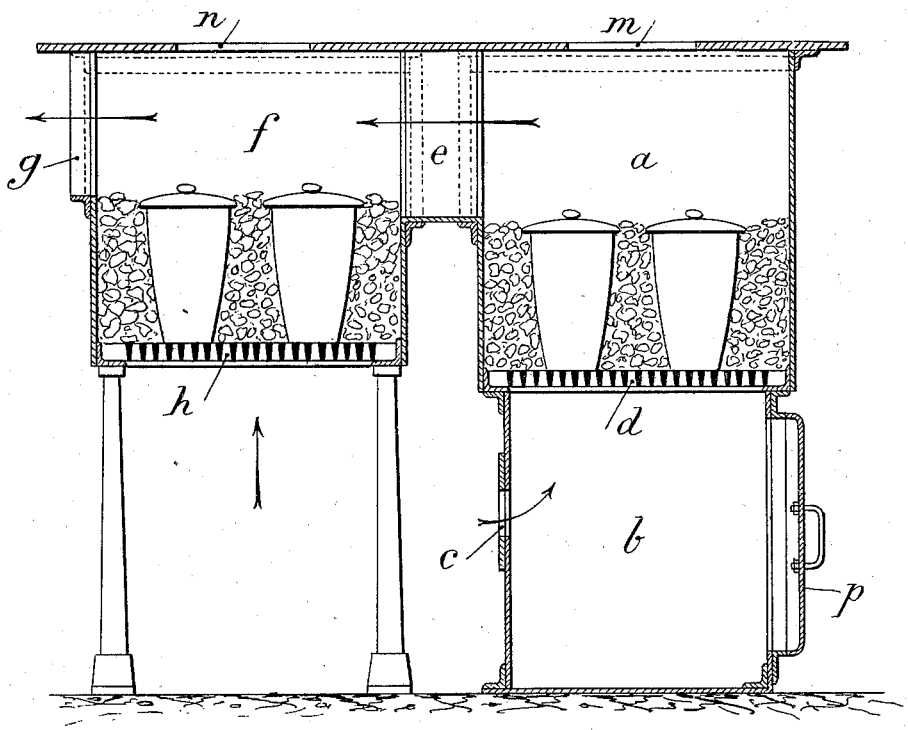
Witnesses.
Anna R. McCole
Margaret L. Smith
Inventor
Albert Emy
By his attorney
Edward P. Thompson No. 731,555.

Patented June 23, 1903.

UNITED STATES PATENT OFFICE.

ALBERT EMY, OF PARIS, FRANCE.

DOUBLE FURNACE.

SPECIFICATION forming part of Letters Patent No. 731,555, dated June 23, 1903.

Application filed December 17, 1902. Serial No. 135,637. (No model.)

*To all whom it may concern:*

Be it known that I, ALBERT EMY, manufacturer, a citizen of the Republic of France, residing in Paris, in the Republic of France, (whose full postal address is Avenue de Villiers, Paris aforesaid,) have invented certain new and useful Improvements in Double Furnaces, (for which application has been made in France, No. 323,112, dated July 21, 1902,) of which the following is a specification.

This invention has for its object an improved form of double furnace with direct firing, in which the heat of the gases of combustion of the first furnace is used for heating the second furnace, the gases serving at the same time to produce a draft in the said second furnace.

In the accompanying drawing an arrangement for carrying out this invention is shown by a vertical section through the center of a double furnace.

The space $b$ below the first furnace $a$ is inclosed on all sides, and air is blown in under pressure through a suitable aperture $c$. The air penetrates into the furnace $a$ through a grate $d$, burns the combustible material therein, and the gases of combustion escape by a passage $e$, which connects the furnace $a$ with the furnace $f$. The gases of combustion coming from the furnace $a$, passing into the upper part of the furnace $b$, supply it with a large quantity of heat and escape by an aperture $g$, which communicates with the chimney.

The burned gases coming from the furnace $a$, passing into the upper part of furnace $f$, serve at the same time to produce a draft in this latter furnace, into which air penetrates from beneath a grate $h$. The space beneath the grate $h$ of the furnace $f$ is partially or completely open, and air is drawn through the grate $h$, while, as before stated, the space $b$ beneath the grate $d$ of the furnace $a$ is completely inclosed, and air is introduced therein under pressure.

The drawing shows a diagrammatic view of a double crucible-furnace heated by direct firing on this improved system.

Apertures $m$ and $n$ serve for the introduction of the crucibles and the fuel into the furnaces $a$ and $f$, respectively, and these apertures are closed when the furnaces are working.

One of the walls which incloses the space $b$ is provided with a door or manhole $p$.

The details of construction of this kind of furnace are not described, because they are known to experts in the trade, and I have only given in the drawing indications serving to enable the object of the invention to be easily understood. I also do not limit myself to the application of my invention to crucible-furnaces alone; but I also reserve the right of applying it to any kind of double furnace in which I may find it of advantage.

I declare that what I claim is—

The combination of a furnace, an inclosed space below said furnace, and means for admitting air under pressure to said inclosed space, with a second furnace open on its under side, a pipe connecting the gas-space of the first furnace with the second furnace, and a flue leading from the second furnace to the chimney, substantially as and for the object set forth.

In witness whereof I have hereunto signed my name, this 2d day of December, 1902, in the presence of two subscribing witnesses.

ALBERT EMY.

Witnesses:
 AUGUSTE FOURNOL,
 EDWARD P. MACLEAN.